(12) United States Patent
Hurlburt

(10) Patent No.: US 6,367,234 B1
(45) Date of Patent: Apr. 9, 2002

(54) CONCAVE SHAPED GRAIN TANK ON AN AGRICULTURAL COMBINE

(75) Inventor: Joseph C. Hurlburt, Lancaster, PA (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 09/636,411

(22) Filed: Aug. 10, 2000

Related U.S. Application Data (60) Provisional application No. 60/155,582, filed on Sep. 24, 1999.

(51) Int. Cl.$^7$ ............................................. A01D 61/00
(52) U.S. Cl. ........................................ 56/16.6; 460/114
(58) Field of Search ........................... 460/114, 12, 119, 460/903, 13, 11; 414/502–505; 56/16.6

(56) References Cited

U.S. PATENT DOCUMENTS

| | | | |
|---|---|---|---|
| 3,664,525 A | * 5/1972 | Herbsthofer | 414/326 |
| 3,872,982 A | * 3/1975 | Rowland-Hill et al. | 414/326 |
| 4,037,745 A | * 7/1977 | Hengen et al. | 414/504 |
| 4,078,685 A | * 3/1978 | Corbin et al. | 414/502 |
| 4,332,261 A | * 6/1982 | Webster | 460/114 |
| 4,455,922 A | * 6/1984 | Brelsford et al. | 98/358 A |
| 4,459,079 A | * 7/1984 | Brelsford et al. | 414/505 |
| 4,522,553 A | 6/1985 | Nelson et al. | 414/526 |
| 4,662,812 A | * 5/1987 | Busboom et al. | 414/523 |
| 4,669,941 A | * 6/1987 | West et al. | 414/310 |
| 4,714,398 A | * 12/1987 | Rohwedder | 414/503 |
| 4,800,711 A | 1/1989 | Hurlburt et al. | 56/219 |
| 4,846,198 A | 7/1989 | Carnewal et al. | 460/21 |
| 4,866,920 A | 9/1989 | Kerckhove et al. | 56/16.6 |
| 4,907,402 A | 3/1990 | Pakosh | 56/14.6 |
| 4,967,544 A | 11/1990 | Ziegler et al. | 56/10.2 |
| 5,155,984 A | 10/1992 | Sheehon | 56/10.2 |
| 5,380,247 A | * 1/1995 | Underwood | 460/114 |
| 5,911,624 A | * 6/1999 | Stauffer | 454/158 |
| 5,980,189 A | * 11/1999 | Rubner | 414/505 |

FOREIGN PATENT DOCUMENTS

JP 0110532 * 4/1999 ........... A01F/12/46

OTHER PUBLICATIONS

Sales Brochure for New Holland Twin Rotor® Combines, dated 1999.
Sales Brochure for New Holland Super Conventional Combines, dated 1999.
Sales Brochure for New Holland Grain Belt Headers, dated 1998.
Sales Brochure for New Holland Corn Head Model 996 indicating 'New for '97', No date.

* cited by examiner

*Primary Examiner*—Robert E. Pezzuto
*Assistant Examiner*—Árpád Fábián Kovács
(74) *Attorney, Agent, or Firm*—John William Stader; Larry W. Miller

(57) ABSTRACT

The invention is a grain tank which pivots about an axis transverse to the direction of travel to facilitate grain flow to the unloading system. The grain tank is sloped and curved to allow the grain to be easily and completely discharged from the tank. Grain is delivered from the clean grain system to a first auger which transports the grain to either a second auger or bubble up auger. The grain can enter the grain tank by the bubble up auger or may be discharged to the unloading system via a second auger. While unloading, the tank pivots from its lowest position to its highest position, only as needed, to maximize output.

7 Claims, 14 Drawing Sheets

CONCAVE SHAPED GRAIN TANK ON AN AGRICULTURAL COMBINE

CROSS-REFERENCE TO RELATED APPLICATIONS

This application claims domestic priority on U.S. Provisional Patent Application Ser. No. 60/155,582, filed on Sep. 24, 1999.

BACKGROUND OF INVENTION

1. Field of Art

This invention relates to the improvement of a grain tank on an agricultural combine. More specifically, the invention allows for the pivoting grain tank to discharge grain from a combine.

2. Description of Prior Art

Mechanical harvesting of grain has taken place for decades. However, efforts continue in the attempt to make harvesting operations more efficient and effective. A combine harvester generally includes a header, which cuts the crop. The header then moves the cut crop into a feeder house. The feeder house lifts the cut crop into the threshing, separation and cleaning areas of the combine. The grain is separated from the stalk by a rotor or threshing system. The grain is then separated and moved and stored in a grain tank. The chaff and trash are deposited from the rear of the combine. The grain stored in the grain tank is eventually discharged through a grain tank unload tube. An operator usually runs these various operations from a glass-enclosed cab. Typically, the cab is located above and behind the header and feederhouse. There are a variety of agricultural combine harvesters and their operations are well known in the art. For examples of such harvesters reference U.S. Pat. No. 4,846,198 which illustrates the conventional and twin rotor threshing and separating systems of a harvester as well as other major systems of the harvester. See also the New Holland Super Conventional Combines TX™ 66, TX™ 68, the New Holland TWIN ROTOR® combines TR® 89 and TR® 99 for examples of existing conventional and twin rotor harvesters. U.S. Pat. No. 4,332,262 also illustrates the primary systems of a conventional harvester. For further details regarding various agricultural harvester systems review U.S. Pat. Nos. 4,522,553, 4,800,711, 4,866,920, 4,907,402, 4,967,544 and 5,155,984. See also the New Holland corn head model 996 and the New Holland grain belt header model 994 for details regarding headers.

The previously mentioned grain is processed in the threshing and separating system. The clean grain then enters a clean grain elevator typically positioned on one side of the combine. The elevator is an endless chain with a series of lift arms attached to the chain. The arms lift the grain upwards. Near the top of the elevator, the grain is deposited into at the base of a bubble-up auger. The bubble-up auger moves the grain upwards and towards the center of the grain tank. At the end of the bubble-up auger the grain is discharged into the grain tank. Some bubble-up augers are hinged near the base so that the auger can rotate or float as the grain fills the grain tank. To discharge the grain from the grain tank, there is an auger positioned at the bottom of the grain tank. This grain tank auger moves grain to a grain tank unloading auger. The grain tank unloading auger is extended away from the grain tank and discharges the grain into a nearby transport vehicle. The base of the grain tank unloading auger may be positioned on the outside of the grain tank. Typically, the unloading auger is positioned at the top of the grain tank or at the base of grain tank. Each design offers unique advantages and disadvantages. When the unloading auger is positioned at the top of the grain tank it is more horizontal. This makes it is less vulnerable to damage by grain transport vehicles and allows better grain discharge control. Plus, the operator can more easily see and position the auger into the transport vehicle. However, the grain needs to be lifted from the base of the grain tank to the top of the grain tank. Each handling operation has the potential of damaging the grain and the added vertical auger causes the unload rate to slowly reduce as the grain tank nears empty. An unloading auger positioned at the base of the grain tank avoids excess handling of the grain, but is more susceptible to damage, reduces control of the discharged grain and limits the operator's ability to align the unload auger tube with the transport vehicle. It would be desirable to have a grain tank unloading system which would allow for the operator to have maximum grain visibility and control without excess handling of grain. Another dilemma occurs when an operator would prefer to discharge grain from the grain tank while still undertaking So harvesting operations. As previously mentioned, the grain presently exits the clean grain elevator, passes through the bubble-up auger and then is moved to the grain tank unloading auger by the grain tank auger. This repetitive handling results in damage to the grain. A final dilemma exists as a result of transporting combine between different crops, countries or regions. Typically, when a combine harvester is transported across a national border or certain state borders, it needs to be completely cleaned and all grain removed. With all of the contours of the grain tank and the various augers, this becomes a time consuming process. A grain tank that would allow complete removal of the harvested grain and facilitate cleaning the rest of the machine would be a great improvement.

An invention that could resolve these issues would represent an improvement to the art.

OBJECTS OF THE INVENTION

It is an object of the present invention to provide a pivoting grain tank.

It is an object of the present invention to provide a pivoting grain tank that rotates about a pivot axis transverse to the forward direction of travel for a combine harvester.

It is an object of the present invention to provide a pivoting grain tank with sloped walls that allows all grain to be easily removed from the grain tank.

It is an object of the present invention to provide a grain tank which allows the grain to be discharged from the tank with a minimum of grain handling and at a nearly constant rate.

It is an object of the present invention to provide a grain tank that moves the unload tube forward to improve the operator's view of the unload process and to reduce the unload tube's rear overhang when its in the transport position.

It is an object of the present invention to provide a series of augers nearly co-axial to the grain tank's pivot axis.

It is an object of the present invention to provide a top hatch on the pivoting grain tank by for easy access to the grain tank.

It is an object of the present invention to provide a grain tank where incoming clean grain may be transported directly to the grain tank unload tube without passing through the bubble up auger.

SUMMARY OF THE INVENTION

The invention is an improvement to the grain tank on an agricultural combine. The invention consists of a grain tank that pivots about an axis transverse to the direction of travel to assist in the removal of grain from the grain tank. Incoming clean grain enters a first auger which moves the grain to either a bubble up auger or second auger. At this point, the grain either enters the bubble up auger to be stored in the grain tank or passes to the second auger and an unloading tube. The first and second augers maybe surrounded by an auger tube with several ports. One or more of these ports can align with the tank, allowing the grain to enter the grain tank, when the grain tank is in the lowered or storage position. Conversely, there are additional ports which allow grain from the grain tank to enter the first and second augers when the grain tank unloading. Since the grain tank has sloped and concave surfaces, almost all tank grain can be discharged. Any grain that remains, can be easily swept through clean out ports in the tank's flat bottom.

BRIEF DESCRIPTION OF DRAWINGS

The advantages of this invention will be apparent upon consideration of the following detailed disclosure of the invention, especially when taken in conjunction with the accompanying drawings wherein.

DETAILED DESCRIPTION OF THE INVENTION

Referring to the drawings, it is possible to observe the major elements and general operation of the present invention. Left and right references are used as a matter of convenience and are determined by standing at the rear of the combine and facing the forward end in the normal direction of travel. Likewise, forward and rearward are determined by normal direction of travel of the combine. Upward or downward orientations are relative to the ground or operating surface. Horizontal or vertical planes are also relative to ground.

Figure 1:
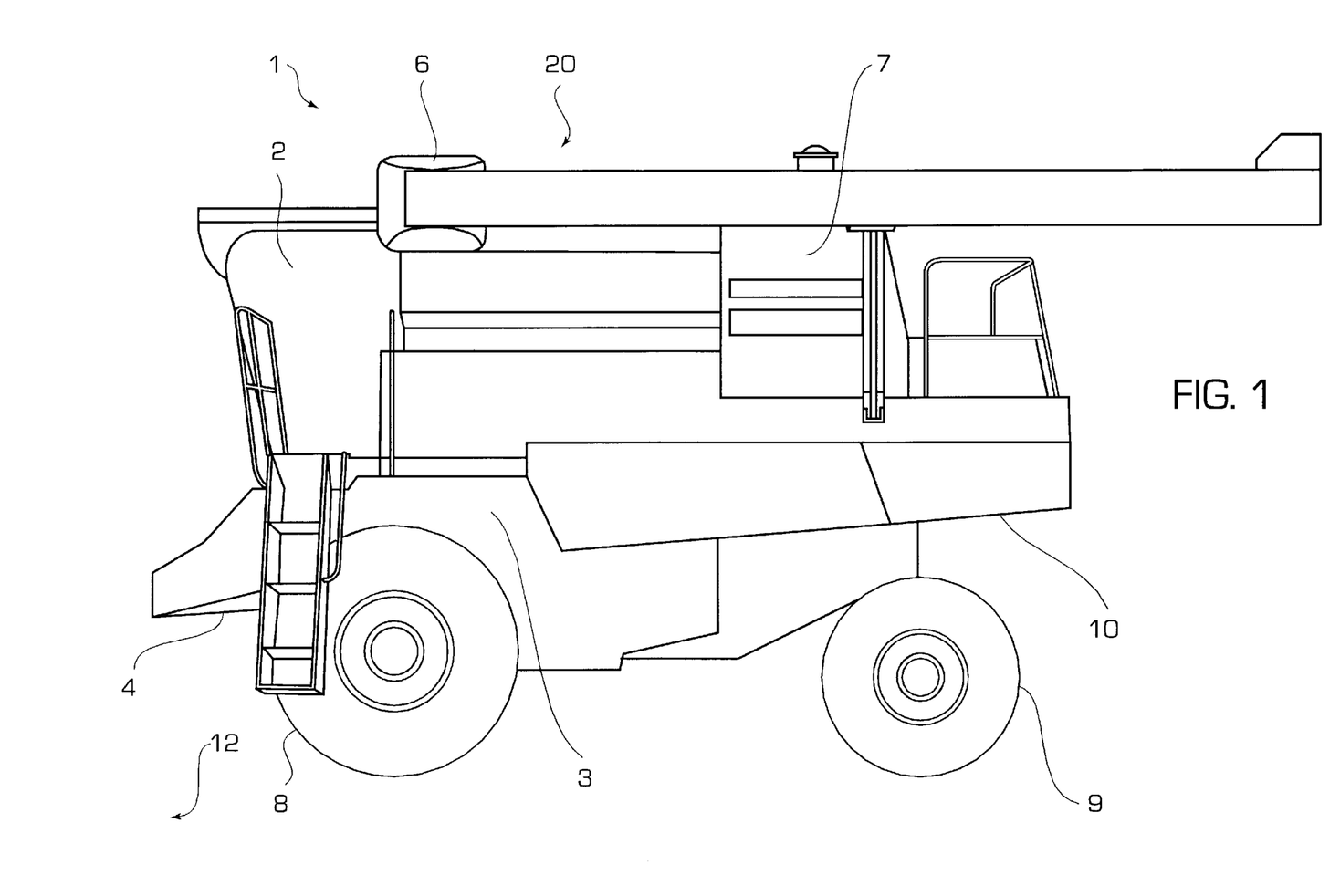
FIG. 1 is a side view of the combine having the present invention.
Figure 2:
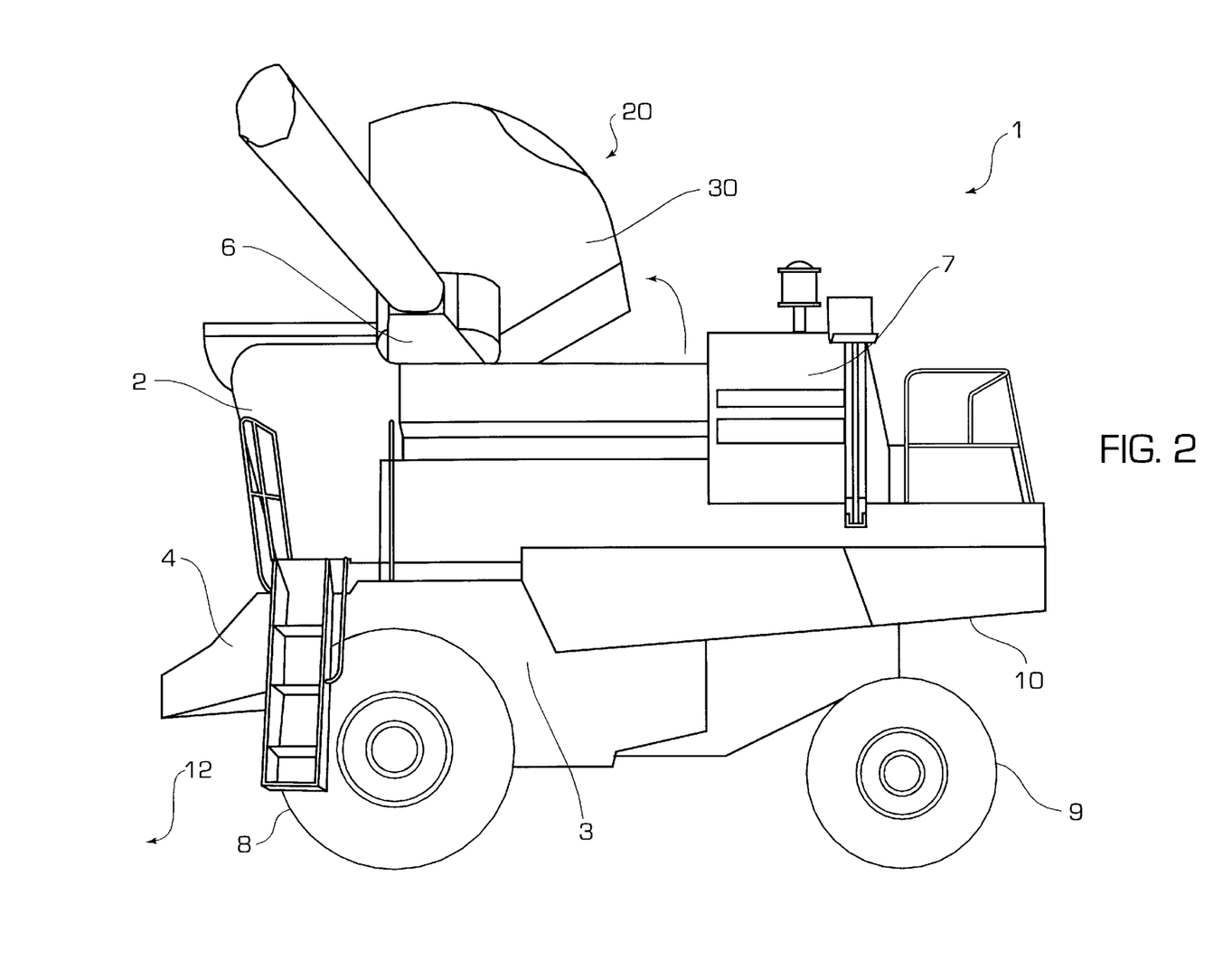
FIG. 2 is a side view of the combine having the present invention wherein the pivoting grain tank has been rotated upwards and the unload auger has been extended.

As seen in FIG. 1, the invention is located on a typical twin rotor combine 1 having a pair of front wheels 8 (only one shown) and a pair of rear wheels 9 (only one shown) for providing movement over the ground. At the front of the combine is a header (not shown) for cutting a crop. As the combine 1 and header 12 are moved forward, the header cuts the grain and stalk. The header moves the grain into an auger trough. A transverse auger pushes the grain and stalk in the auger trough to the center of the header. The header 12 may be positioned and re-positioned relative to the ground. The header may also be tilted to the left or right or may be positioned relatively high or low to the ground. These features are constantly being adjusted depending on the terrain and crop conditions. Moveable headers are well known and established in the art. Located at the rear center of the header is the feederhouse 4 or elevator. The feederhouse 4 moves the grain and stalks rearward into the threshing 3, separation, cleaning and clean grain systems of the combine 1. As seen in FIG. 1, the threshing 3, separation and cleaning system is a TWIN ROTOR® (system used on TR 98 combines. However, the invention is also applicable to the AXIAL FLOW ® (single rotor) combine. The design and operation of these systems are well known and described in the prior art. After processing, separation and cleaning the grain is stored in a grain tank system 20 located near the top of the combine 1. The grain is transferred from the grain tank system 20 to a transport vehicle by an unloading auger through the grain tank unload tube 6. Usually during the harvesting operations, the unloading auger remains undriven and the grain tank unload tube 6 remains retracted as shown in FIG. 1. However, the combine can be unloaded 'on the go'. A separate vehicle such as a truck or tractor-pulled grain cart drives beside the moving combine. The processed grain is discharged while the combine and receiving vehicle are moving. As shown in FIG. 2, after sufficient grain has been accumulated in the grain tank 30, the operator extends the unload tube 6. The operator then positions the end of the unload tube 6 over the receptacle. Unloading augers and unload auger grain tubes are well known and established in the art. The trash or chaff is ejected from the rear of the combine by a chaff spreader 10. The operator controls the combine 1 from the cab 2 located behind the header and at the front of the combine. From the cab the operator can observe most the various combine functions. The cab 2 usually has a large glass window or several windows which afford the operator the maximum ability to monitor the header. The combine 1 and various systems are powered by an engine 7 generally positioned at the rear of the combine 1. Most of the major systems in a combine are discussed and well known in the prior art.

Figure 3:
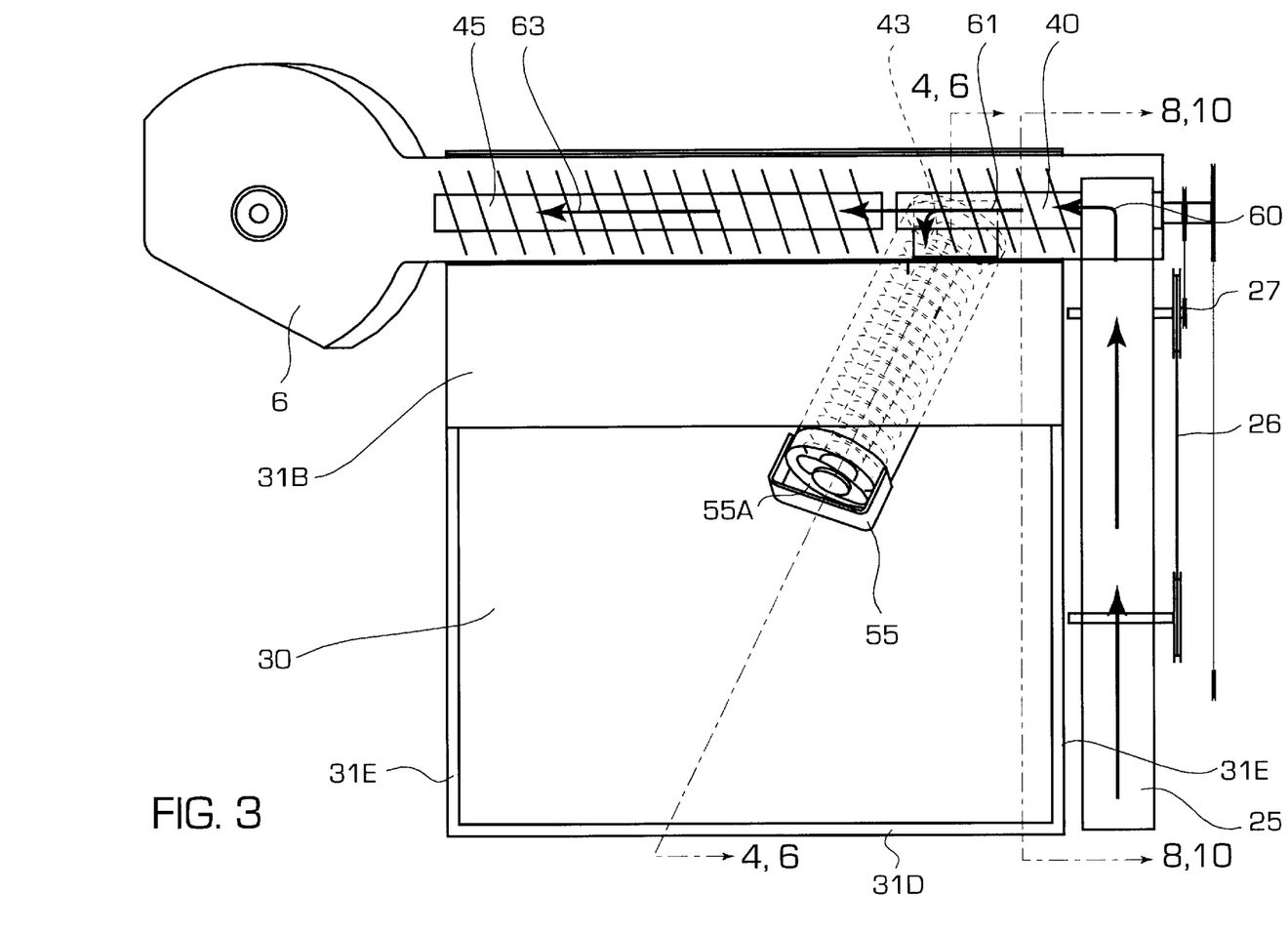
FIG. 3 is an overhead view of the grain tank.
Figure 4:
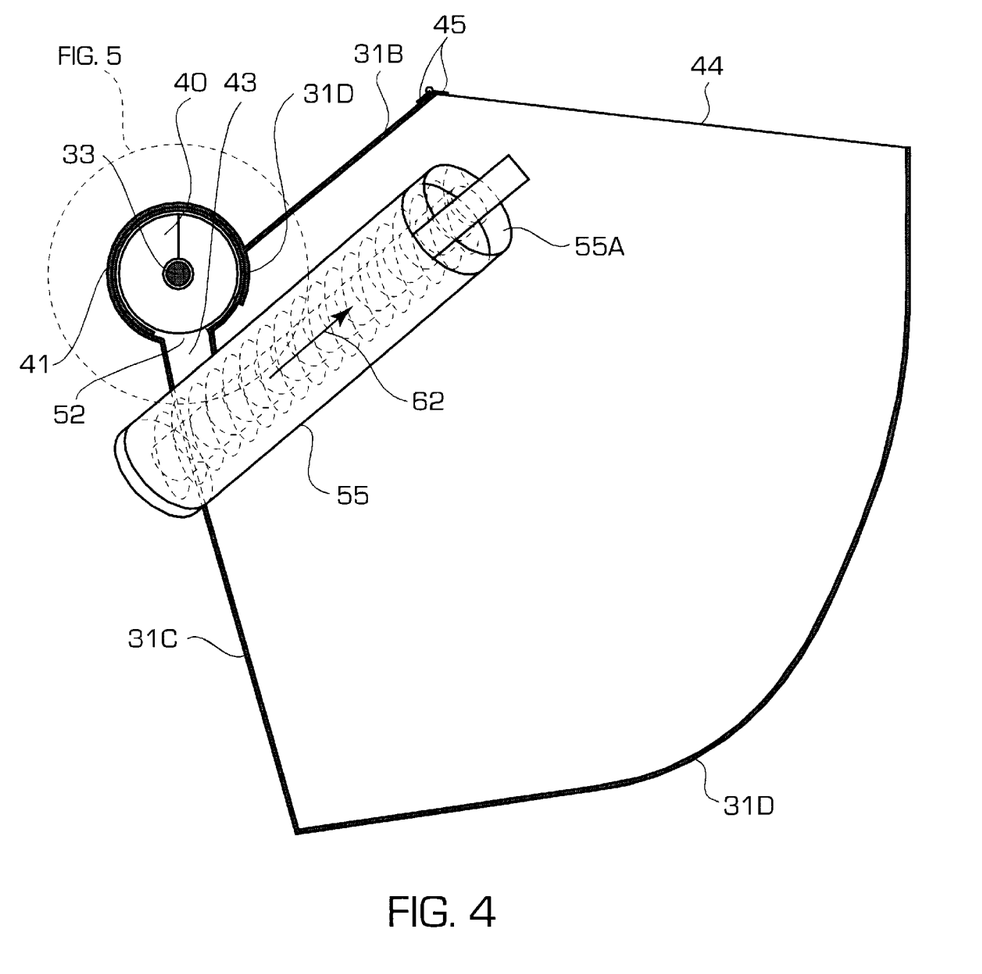
FIG. 4 is cutaway view of the tank along line 4—4 in FIG. 3 while the grain tank is in the lowered position.

The present invention focuses on the grain tank dump system 20 which can be generally observed in FIG. 1 and 2. FIG. 1 shows the grain tank 30 in the down or storage position and FIG. 2 shows the grain tank in the upward or unloading position. FIGS. 3 and 4 provide a general schematic view of the tank. Generally, the crop enters the grain tank 30 through the clean grain elevator 25. The crop flow 60 exits the grain elevator 25 and is moved by the first auger 40. The grain either enters a bubble-up auger 55 or continues over to the second auger 45. The grain flow 63 in the second auger is discharged into the unload turret. The grain which enters the bubble up auger 55 is discharged into the grain tank 30. When the grain tank 30 is full the unloading auger is extended over the transport vehicle, the unloading system drives are engaged (this disengages the drive to the bubble up auger 55). Then, tank 30 is rotated upwards about the first and second augers 40 and 45, as needed to keep the unloading system full of grain. Grain from grain tank 30 is moved to the turret 6 via the first and second augers 40 and 45. As seen in FIG. 2, while this unloading operation is occurring, the unload tube 6 is extended and is discharging the grain into a grain wagon or similar conveyance (not shown).

Figure 5:
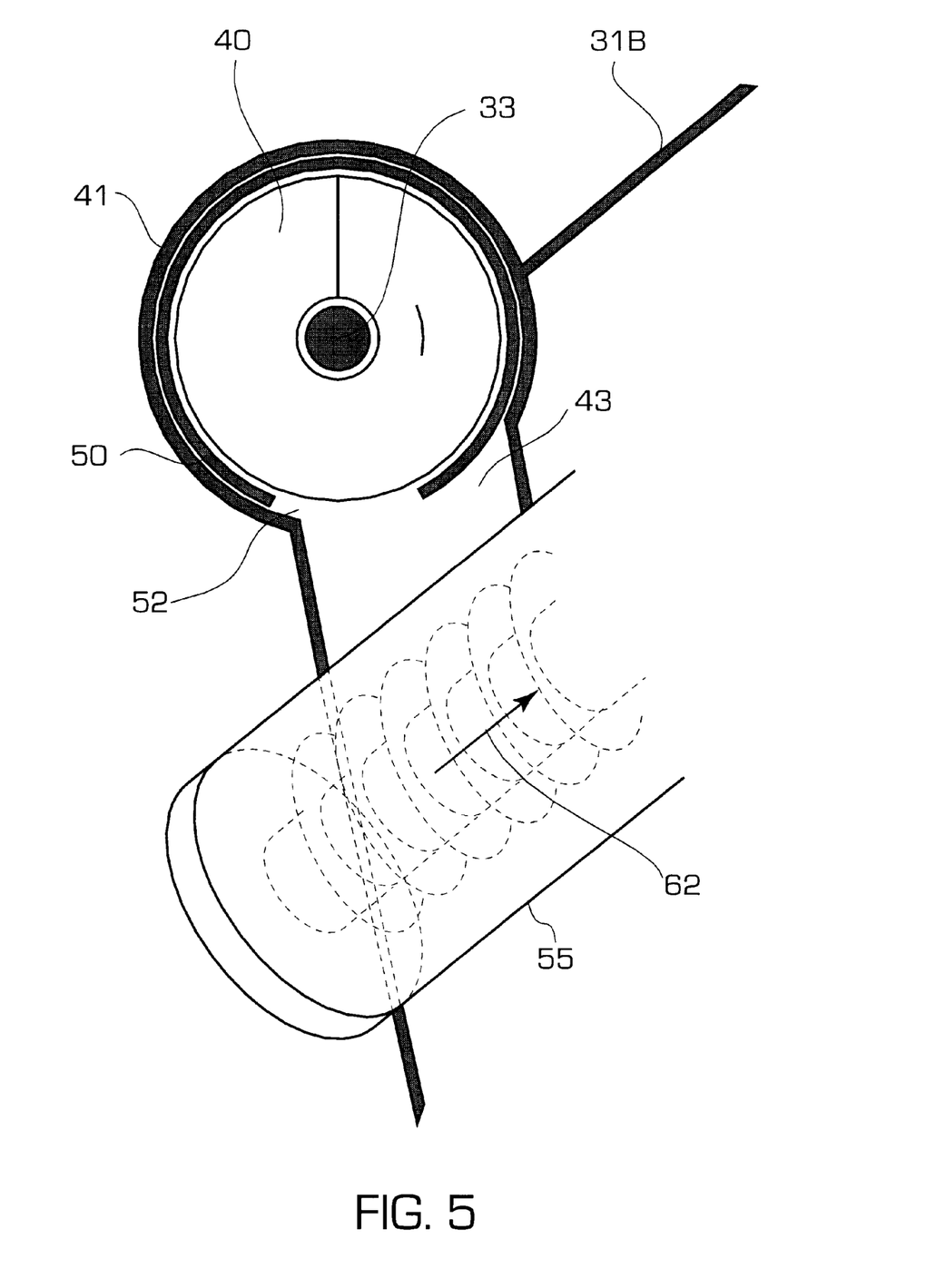
FIG. 5 is a close-up view of FIG. 4 showing the auger tube.
Figure 6:
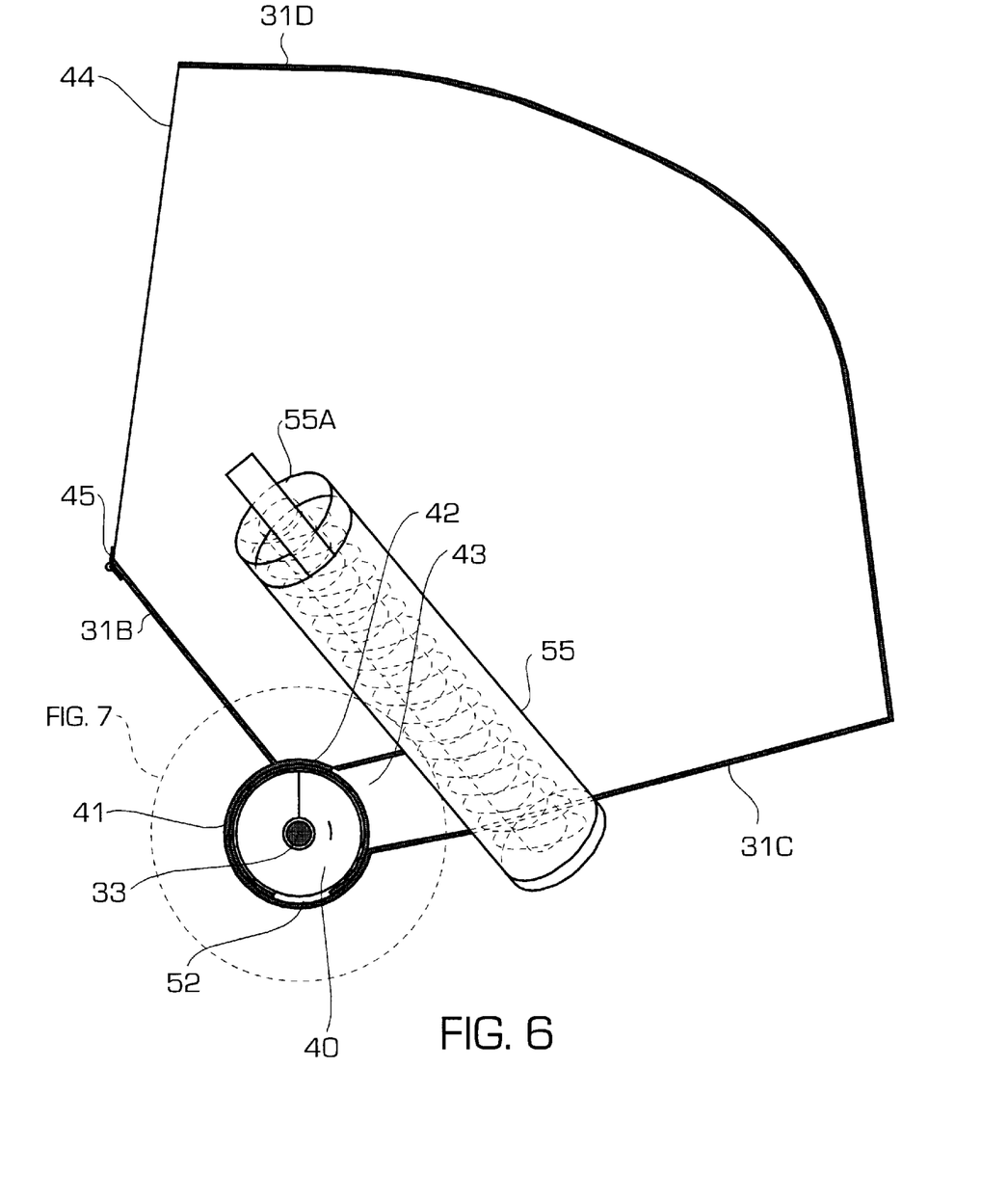
FIG. 6 is a cutaway view of the tank along line 6—6 in FIG. 3 after the grain tank has been partially rotated into the upward or unloading position.
Figure 7:
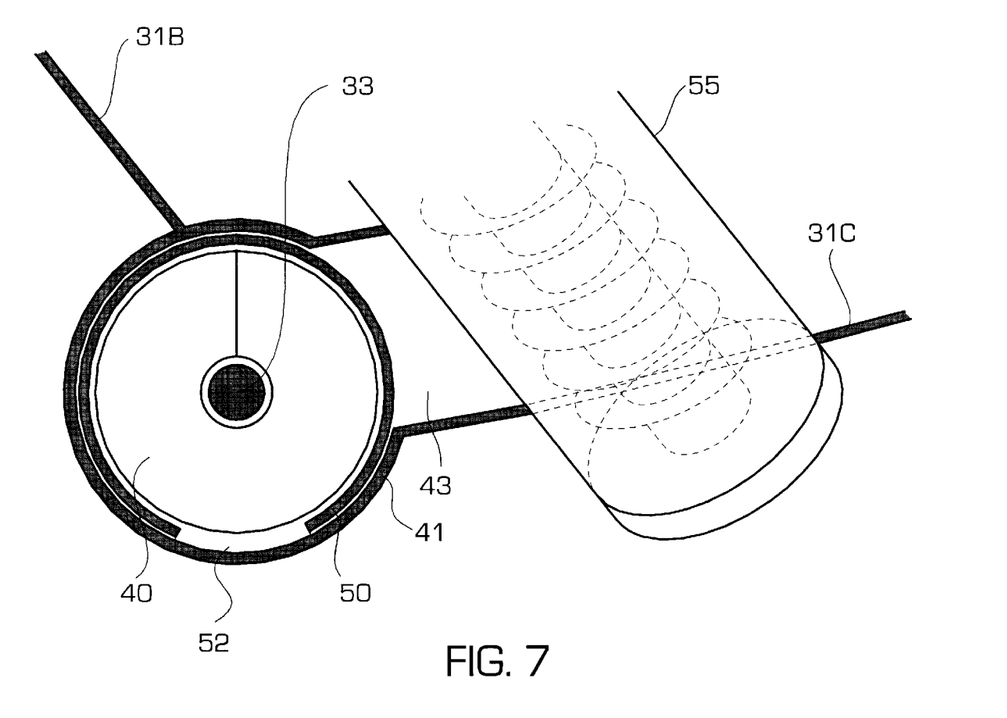
FIG. 7 is a close up view of FIG. 6 showing the auger tube.
Figure 8:
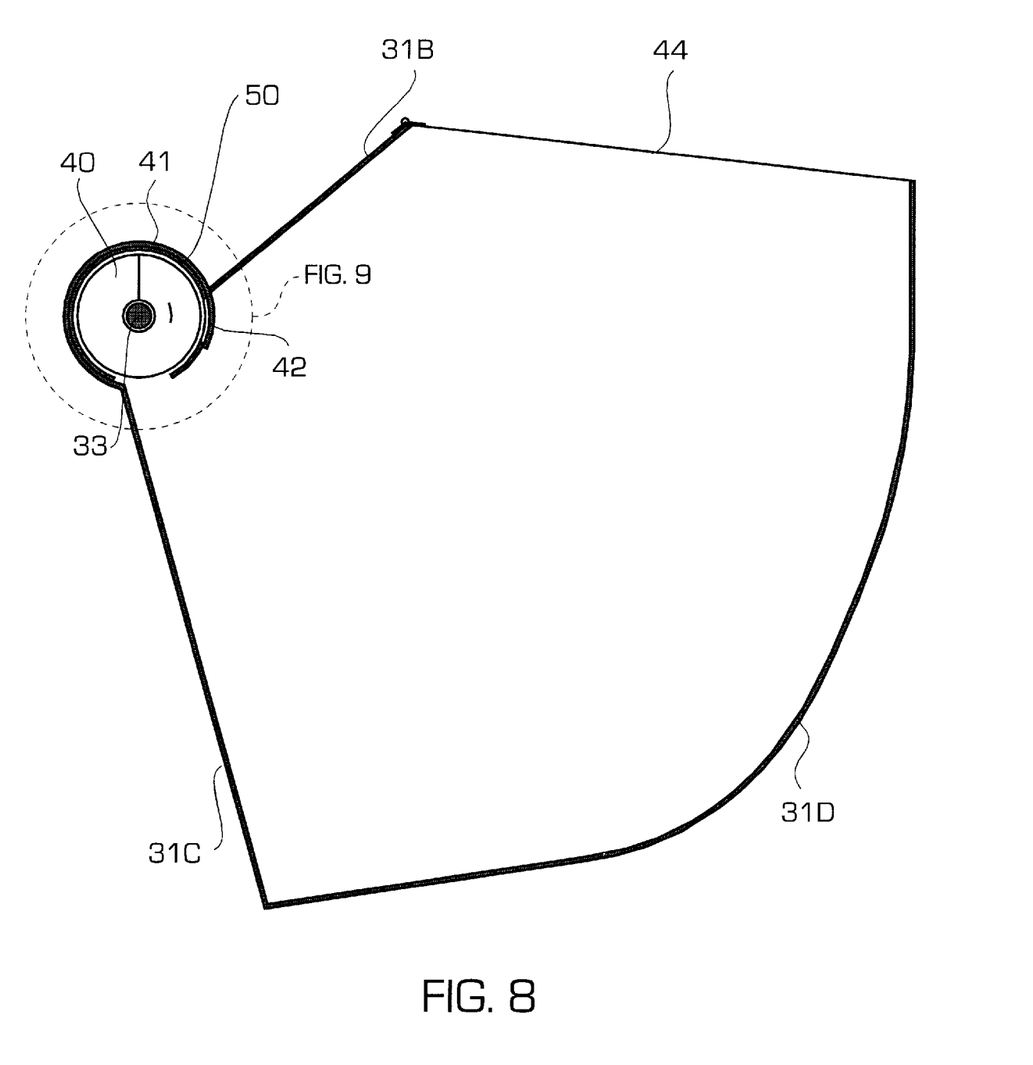
FIG. 8 is a cutaway view of the tank along line 8—8 in FIG. 3 while the grain tank is in a lowered position.
Figure 9:
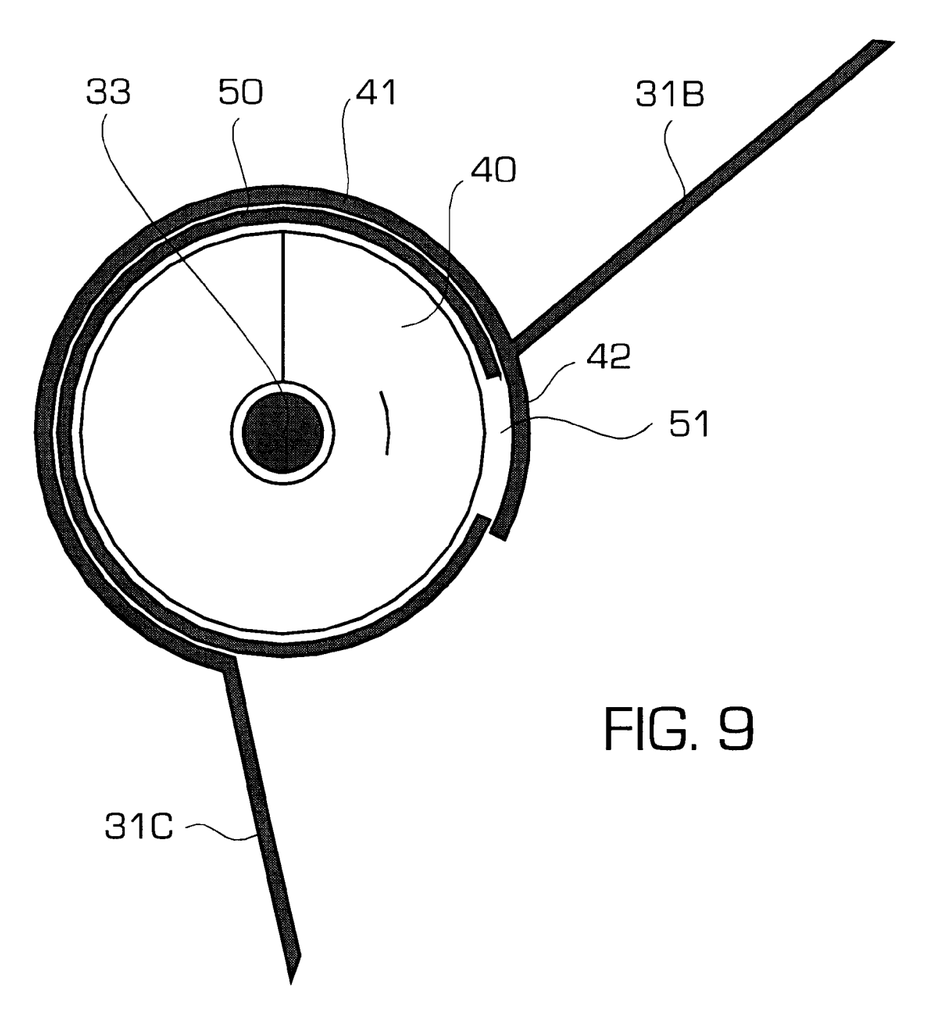
FIG. 9 is a close up view of FIG. 8 showing the auger tube.
Figure 10:
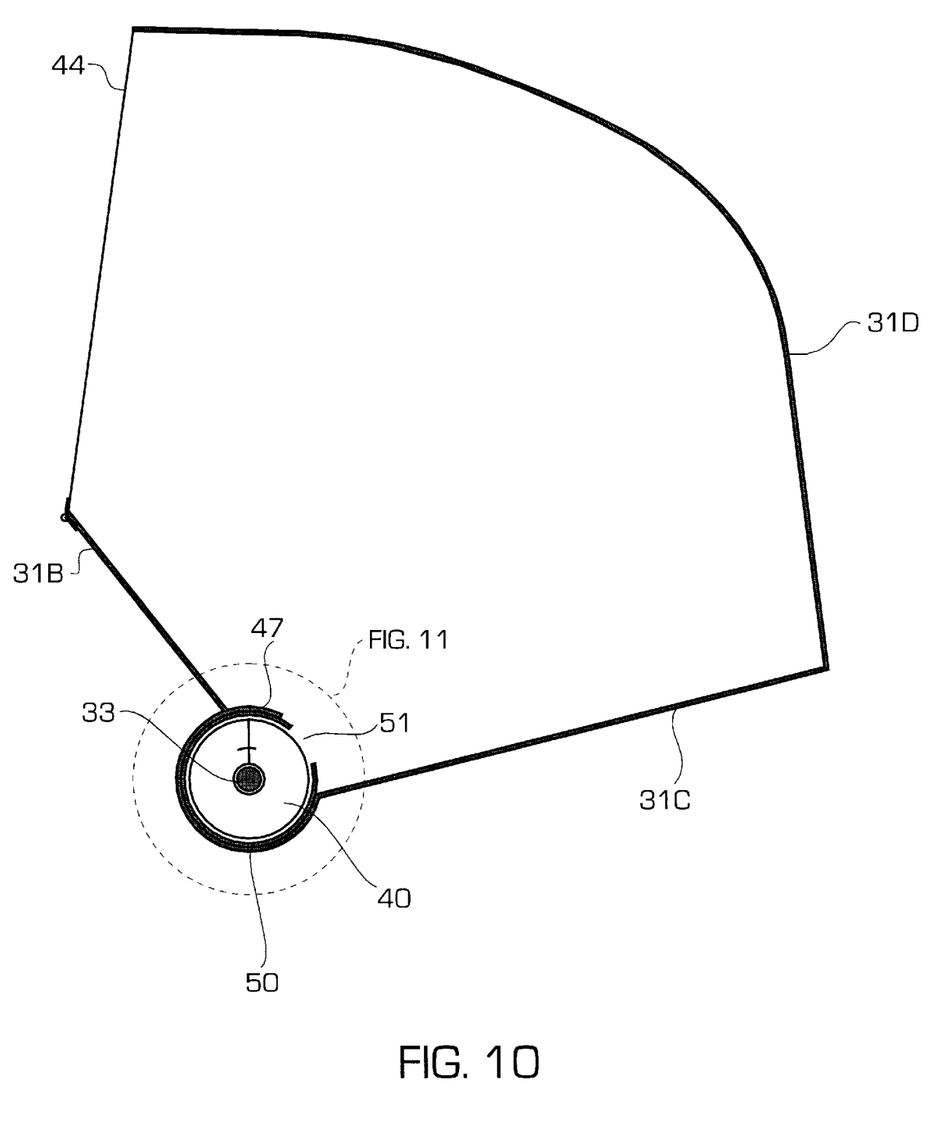
FIG. 10 is a cutaway view of the tank along line 10—10 in FIG. 3 while the grain tank is in a partially raised position.
Figure 11:
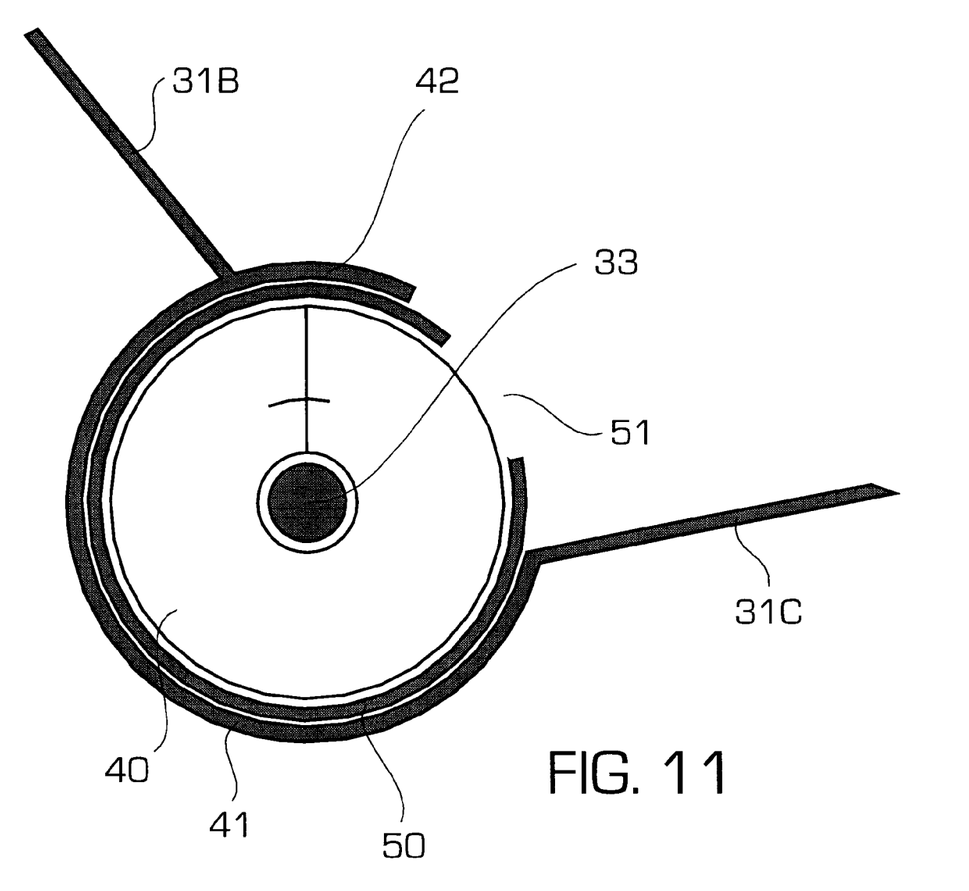
FIG. 11 is a close up view of the FIG. 10 showing the auger tube.
Figure 12:
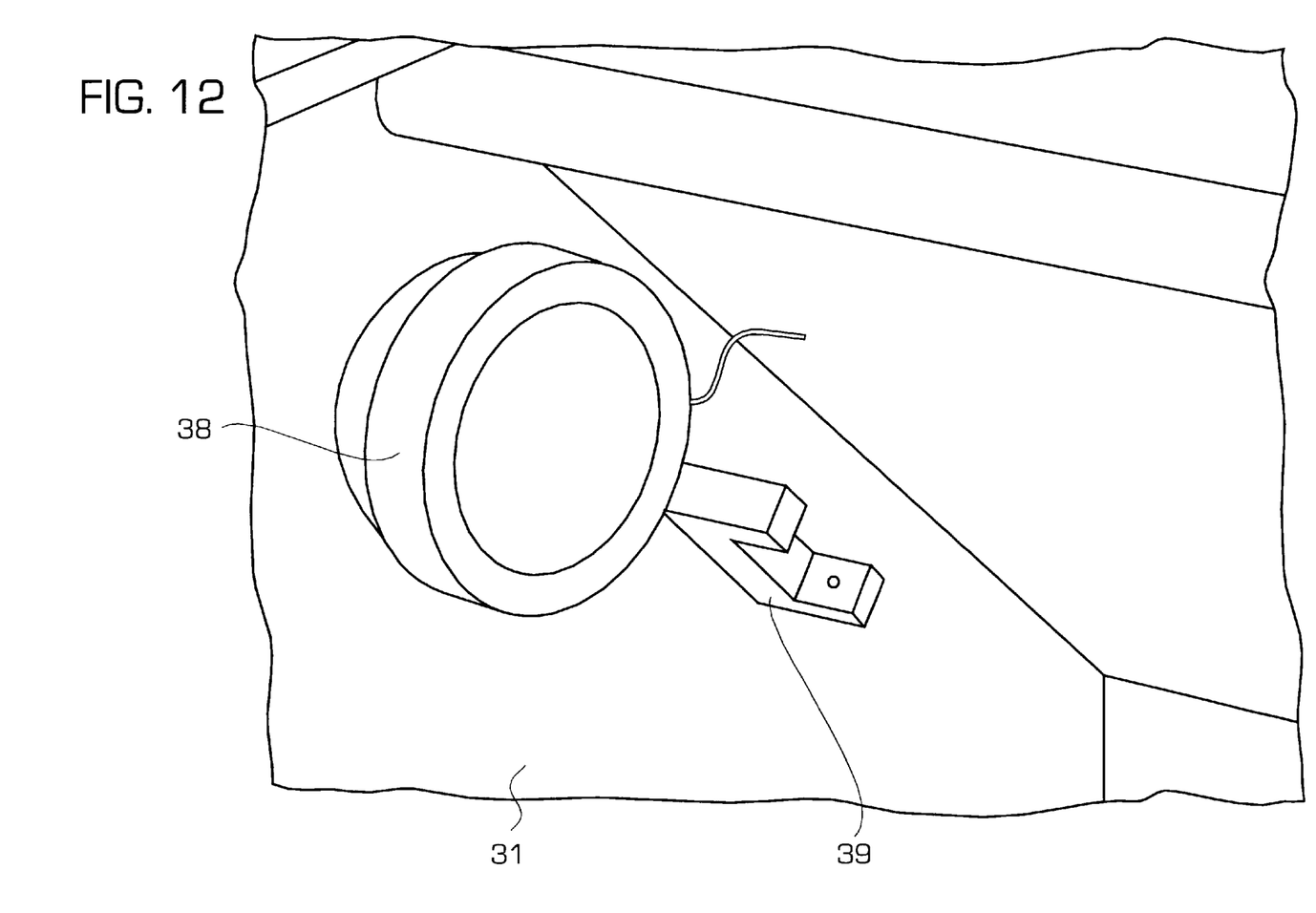
FIG. 12 is a close up view of the inner region having the light and sensor.
Figure 13:
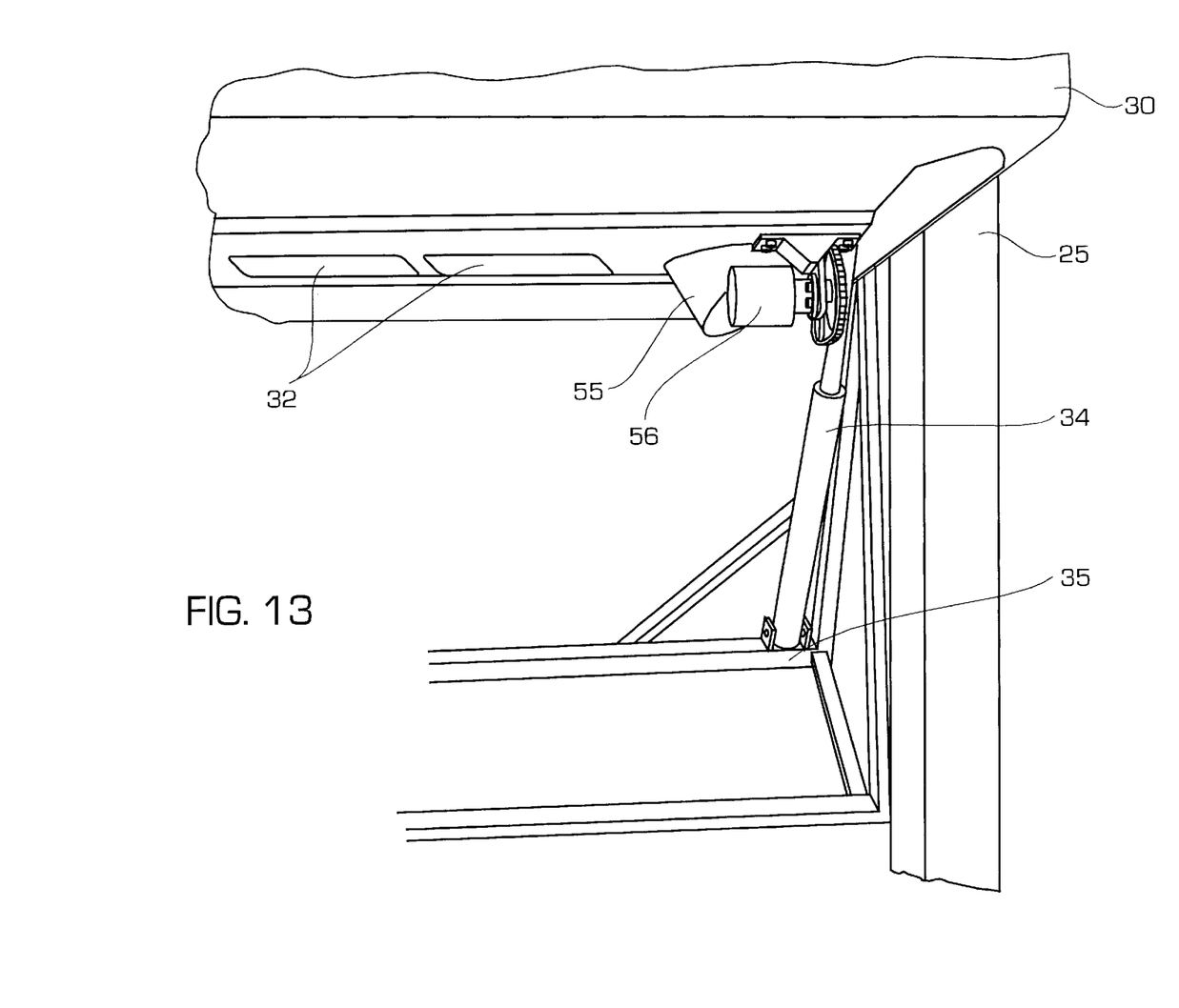
FIG. 13 is a close up view of the grain tank in the unload position with the lift cylinder extended.
Figure 14:
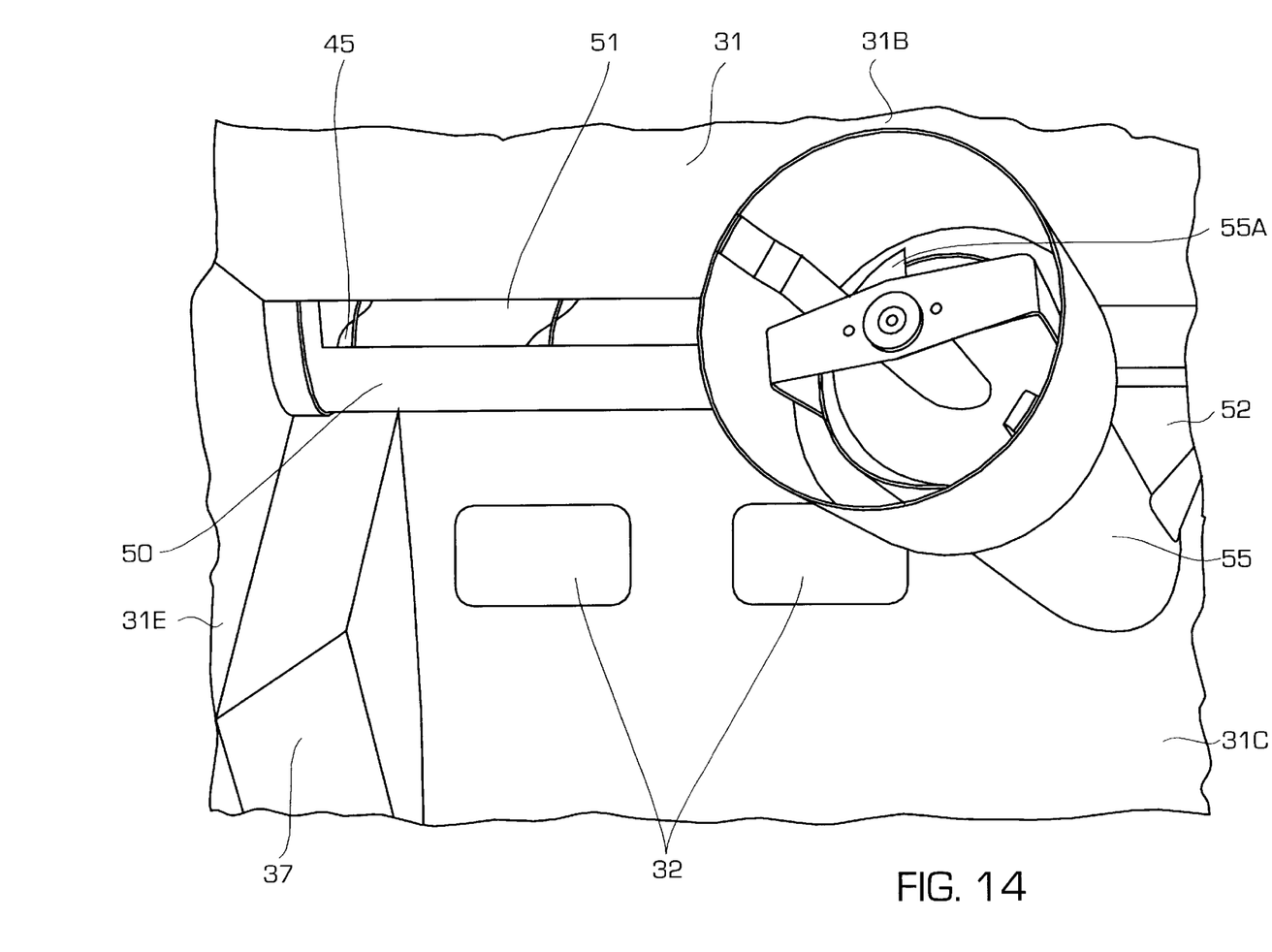
FIG. 14 is a view of the interior of the grain tank showing the inner region, side wall and window.

Now that the general elements have been reviewed it is possible to discuss the invention in greater detail. The pivoting grain tank 30 consists of a curved grain tank as viewed in FIGS. 2 and 3. The tank 30 has a pair of opposing side walls 31E. Attached to the side walls 31E is the concave region 31D (as seen in FIG. 4, 6,8 and 10). Attached to the concave region 31D is the inner region 31C. Attached to the inner region 31C and opposing the concave region 31D is the concave auger region 41. Attached to the concave auger region 41 is the top region 31B. Affixed to the top region 31B is the top hatch. The top hatch is hinged to the top region 31B. The top hatch can be opened to allow access to the interior of the grain tank 30. Also attached to the circumference of the concave auger region 41 is a cover 42 (FIGS. 8 and 9). As seen in FIGS. 6 and 10, the inner region 31C and top region 31B slope towards the concave auger region 41 when the tank is rotated upwards to an unloading position. Attached between the side walls 31E and the combine frame 35 are a pair of conventional hydraulic lift cylinders 34 (FIG. 13). The side walls 31E have a recessed portion that an end of the hydraulic lift cylinder 34 is attached to. Windows (32) allow an operator in the cab to view the interior of the lowered grain tank 30 (FIGS. 13 and 14). As seen in FIGS. 3 and 5, there is a sump 43 attached to the concave auger region 41. Attached to the sump is a bubble up auger 55, which discharges at an exit or discharge 55A. The bubble up auger is powered by a conventional hydraulic motor 56 (FIG. 13). There is also a light 38 (FIG. 12) which can be attached to the side wall 31E. A sensor 39 (FIG. 12) can also be affixed to the side wall 31E to allow for the detection of grain. The sensor can inform the operator when the grain tank 30 is full and that grain covers the second auger 45. The sensor can also directly control the tank's pivotal movement.

Inside and generally co-axial to the concave auger region 41 is the first auger 40 and second auger 45. The first auger 40 is powered by a typical chain and sprocket drive with grain elevator 25. The second auger has a separate mechanical drive. The unloading auger system is rotated by a hydraulic drive (not shown) which alternatively powers motor 56 and the bubble up auger 55. Surrounding the first and second augers 40 and 45 is a fixed auger tube 50. The auger tube 50 has a sump port 52 and several auger ports 51. The fixed auger tube 50 and augers 40 and 45 are co-axially aligned. The auger ports 51 in the auger tube 50 are positioned proximate to the first auger 40 and second auger 45. The sump port 52 is positioned below first auger 40 and above the sump 43. The sump 43 passes grain to and from the bubble up auger 55. The orientation of the cover 42, auger ports 51 and sump port 52 on the auger,tube 50 will be discussed later.

As previously, briefly discussed and seen in FIG. 3, the crop flow 60 is lifted by the clean grain elevator 25 from the cleaning and separating shoes (not shown). The elevator 25 is a conventional clean grain elevator having a series of lift arms mounted on an endless chain. The chain is driven by an elevator drive which is conventionally a belt driven sheave 27. At the top of the elevator 25, the crop flow 60 exits the elevator and is deposited onto the first auger 40. The first auger 40 is a conventional auger within a fixed auger tube 50. The crop flows (arrow 61) along the first auger 40 until it reaches the sump port 52 and sump 43 for the bubble up auger 55 or second auger 45.

Only with the tank lowered hydraulic motor 56 operates the bubble up auger 55. Alternately a second hydraulic motor drives the unloading auger system 6. If the bubble up auger 55 is operating, then the unloading auger system and second auger 45 are shut off. As seen in FIG. 4 and 5, the grain exits the sump port 52 into the sump 43 and bubble up auger 55. The grain is then moved by the bubble up auger 55 (as seen by arrow 62), thus filling the grain tank 30. As tank 30 becomes nearly full, the grain level rises above the auger tube 50 and auger ports 51. Some grain is free to flow through the exposed auger ports 51 into the auger tube 50 and static second auger 45. With the grain tank 30 in the filly down position, and the unloading drives engaged, grain can flow from the top of tank 30 to the second auger 45 and unloading auger system. At the same time, the bubble up auger 55 will stop, sump 52 will fill and the crop 61 will pass to the second auger 45. As needed to maintain exit flow, the grain tank 30 can be rotated upwards when the lift cylinders 34 are extended. The grain tank 30 pivots about a pivot axis 33 which is transverse to the combine's normal, forward direction of travel 11. The pivot axis 33 is co-axial with the first and second augers 40 and 45 and generally co-axial to the concave auger region 41. As the lift cylinders rotate the grain tank 30, grain continues to re-enter the auger tube 50 through the auger ports 51 positioned about the second auger 45. The second auger 45 pushes the grain to the unloading auger system to be unloaded (as seen in arrow 63). Regardless of its contents, with the grain tank 30 in the fully down position and the unloading drives engaged it's possible to move grain directly from the clean grain system to the unloading auger system. In this scenario, the bubble up auger 55 drive is turned off and auger 45 and the unloading auger system drives are engaged. The grain passes directly from the first auger 40 to the second auger 45 and is then forwarded to the unloading auger system (as seen in arrow 63).

Auger ports 51 on the auger tube 50 allow for the grain to re-enter the second auger 45 anytime. Auger ports 51 allowing grain to re-enter the first auger 40 are restricted. Specifically, the auger ports 51 are covered by the cover 42 when the grain tank 30 is lowered (as seen in FIGS. 8 and 9). When the tank 30 is raised, the cover 42 rotates with the tank to allow grain from the tank 30 to pass through auger ports 51 to the first auger 40. Only one auger port 51 in the auger tube 50, or multiple ports in the tube 50 are possible. The sump port 52 in the auger tube 50 aligns with the sump 43 when the tank 30 is in the lowered position (as seen in FIGS. 3, 4 and 5). When the tank 30 is raised, sump 43 aligns with an auger port 51. This allows grain to back feed from sump 43 and the bubble up auger 55 to the first auger 40.

The advantages to the present invention allow for the grain to either be conveyed directly from the clean grain system to the unloading auger system without excess handling exhibited by present combines. Additionally, the slope of the inner tank surfaces allow the grain to easily empty from the grain tank 30. This is especially advantageous when the combine is transported across national borders. All of the grain is removed easily from the tank 30. Additionally by being able to rotate the tank to the raised or unload position 70, it is possible to gain cleaning access to the engine, threshing and cleaning systems and for easier maintenance. Usually the bulk of the volume of grain positioned in the grain tank 30 is positioned beneath the pivot axis 33 and concave auger region 41. This keeps the center of gravity of the grain tank 30 low and improves stability of the entire combine. It should be recognized that the sensor 39 can control the extension of the lift cylinders 34 and the lifting of grain tank 30.

It will be obvious to those skilled in the art that various changes may be made without departing from the scope of the invention and the invention is not to be considered limited to what illustrated in the drawings and described in the specification.

What is claimed is:

1. In a combine harvester, said combine having a header with a header frame and a sicklebar cutter, said header operationally connected to a threshing and separating system by a feederhouse, said threshing and separating system operationally connected to a grain tank, said grain tank operationally connected to a grain unloading system, said combine having an engine and a chaff spreader, said combine having a frame and a forward direction of travel, said grain tank further comprising:

a. a pair of opposing sidewalls, each sidewall having a pivot axis transverse to the forward direction of travel, wherein the pivot axis approximates an intersection with and is generally co-axial to an extended unloading auger tube;

b. means to rotate the tank sidewalls about said pivot axis;

c. a concave auger region co-axial to the pivot axis and affixed to the sidewall;

d. an inner region having a window, the inner region affixed to the sidewall and auger region;

e. a top region affixed to the sidewall and auger region; and f. a concave region affixed to the sidewall, top region and inner region.

2. The improvement in claim 1 where a grain elevator discharges a volume of grain into the auger region and said volume of grain is discharged from the auger region directly to the grain unloading system.

3. The improvement in claim 1 wherein the pivot axis is located higher than the tank is in the lowered position.

4. The improvement in claim 1 wherein the combine is equipped with a cab and the concave auger region is positioned proximate to an upper rear corner of the cab.

5. The improvement in claim 3, wherein the top region and inner region are sloped to direct a volume of grain to the concave auger region when the means to rotate the tank is extended.

6. The improvement in claim 5, wherein the threshing system is a twin rotor system.

7. The improvement in claim 5, wherein the threshing system is an axial flow rotor system.

* * * * *